Figure 1:
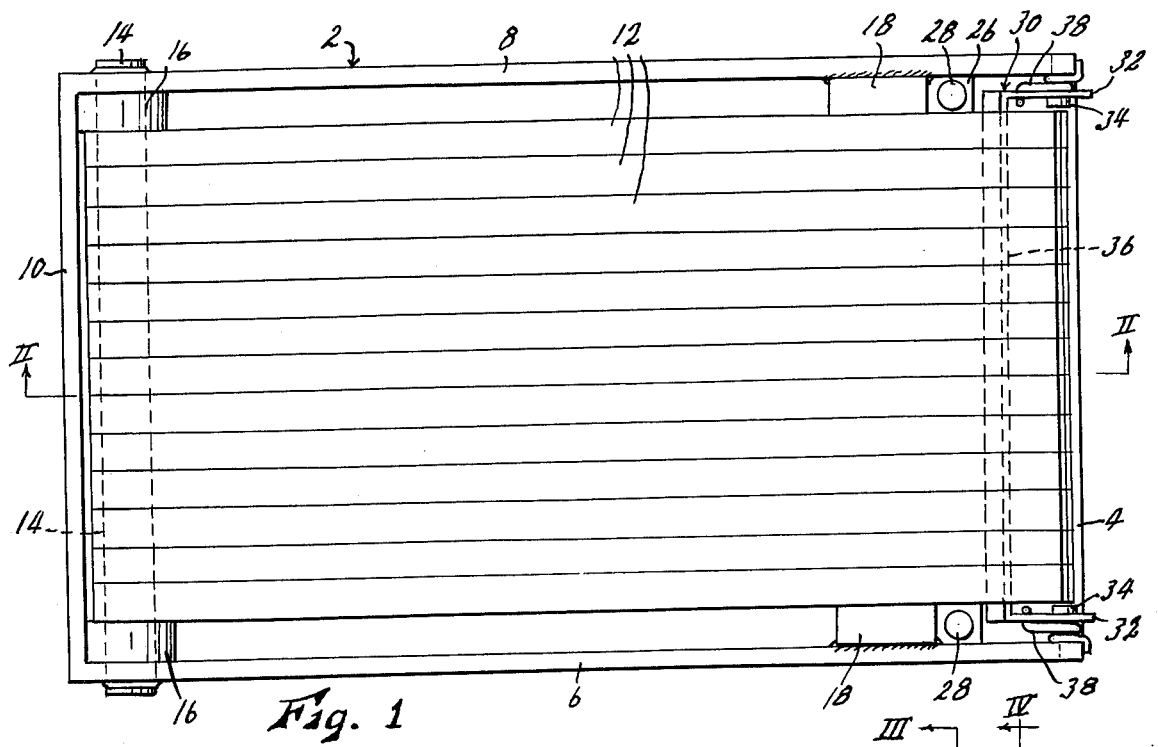

United States Patent [19]

Newby

[11] 4,084,431
[45] Apr. 18, 1978

[54] TIRE INFLATION GAUGE

[76] Inventor: Jack C. Newby, 113 S. Oak St., Eureka, Kans. 67045

[21] Appl. No.: 766,925

[22] Filed: Feb. 9, 1977

[51] Int. Cl.² .............................................. B60C 23/06
[52] U.S. Cl. .................................................. 73/146.2
[58] Field of Search .............. 33/174 PA, 203, 203.11, 33/203.12; 73/146, 146.2

[56] References Cited

U.S. PATENT DOCUMENTS

| 2,313,156 | 3/1943 | Kratt, Jr. | 73/146 |
| 3,183,481 | 5/1965 | McCrory | 73/146 |
| 3,478,582 | 11/1969 | Hough | 73/146.2 |
| 3,973,436 | 8/1976 | Lenderman | 73/146.2 |

Primary Examiner—Richard E. Aegerter
Assistant Examiner—Richard R. Stearns
Attorney, Agent, or Firm—John A. Hamilton

[57] ABSTRACT

A tire inflation gauge consisting of a series of closely adjacent bars pivoted at one end on a horizontal axis and separate, independent springs supporting their opposite ends, onto which an automobile wheel may be driven in a direction parallel to the bars, the bars being depressed equally or unequally depending on the uniformity of weight supported respectively thereby, and a visual gauge for indicating the relative depression of the bars.

5 Claims, 9 Drawing Figures

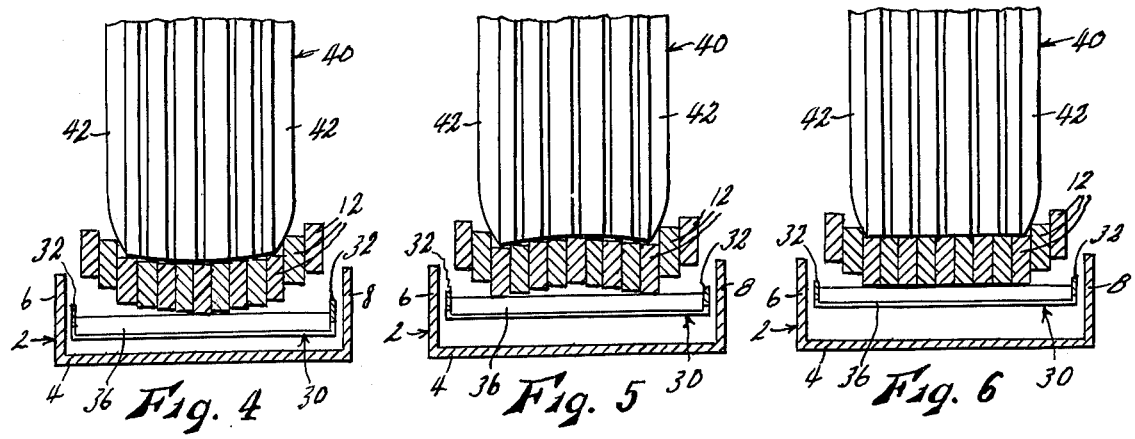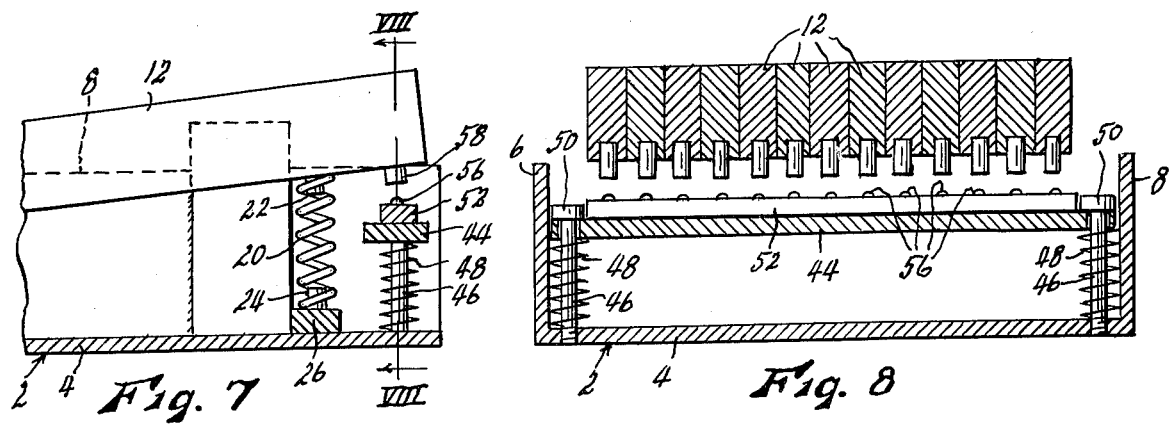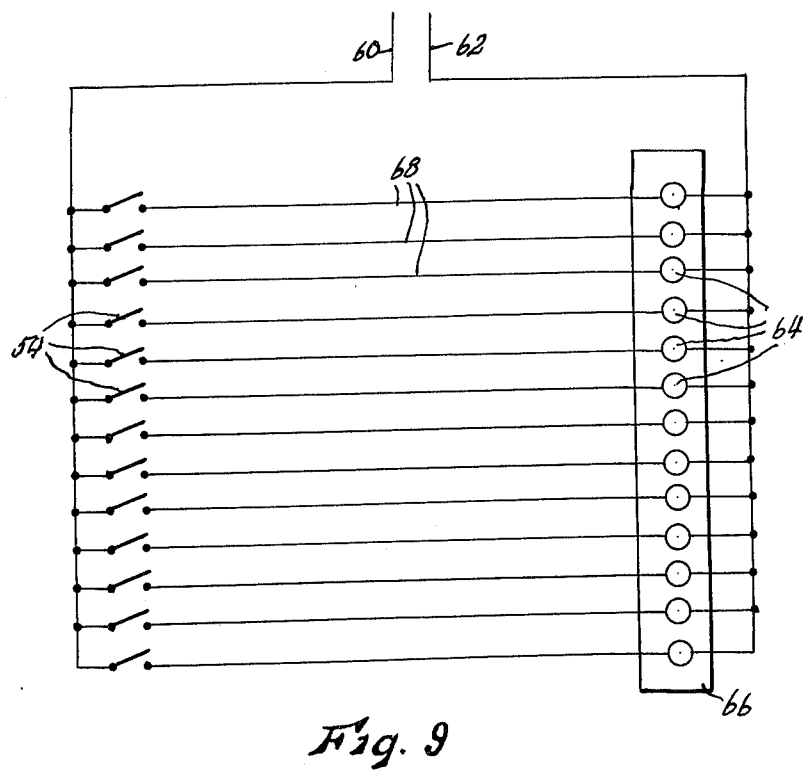

TIRE INFLATION GAUGE

This invention relates to new and useful improvements in gauges for indicating the proper degree of inflation of automobile tires, and has as its principal object the provision of an inflation gauge which does not respond directly to the magnitude of the air pressure in a tire, but to the physical shape of the tire.

It is of course well known that the mileage available from any tire is greatly decreased if it is not maintained inflated to a proper degree, while it will be greatly increased if the proper inflation is maintained. However, it is not always easy to determine what the proper degree of inflation actually may be for any given tire. Pressures "recommended" by automobile and tire manufacturers are generally set to provide a soft, comfortable "ride," not for maximum mileage, the latter usually requiring a somewhat higher air pressure. Moreover, the optimum air pressure for maximum tire wear varies with other factors, such as tire construction, temperature and degree of wear.

It has been determined that best tire mileage and least wear is obtained when the vehicle weight supported by a tire is uniformly distributed across the width of the tread face of the tire. When a tire is over-inflated, the tread tends to assume a "crowned," or transversely convex configuration. On the other hand, if the tire is under-inflated, its tread surface tends to assume a transversely concave configuration. The tread face engaging a flat road surface of course does not actually assume these transverse curvatures, being maintained transversely level by its pressure against the road surface. Nevertheless, the tendency to the described transverse curvatures is demonstrated by a transversely distributed variation in the pressure of the tire against the road surface. In the case of an over-inflated tire, the center portion of the tread, midway between its side edges or "shoulders," carries proportionately more weight per unit of width than the side portions, and the tire therefore tends to wear away more rapidly at its tread center than at its side shoulders. An under-inflated tire, on the other hand, carries proportionately more vehicle weight at the side or shoulder portions of its tread than at the center of the tread, and tends to wear excessively at its shoulders. Moreover, the weight supported by the excessively loaded portions of the tread is far greater than would be required if the vehicle weight were distributed uniformly across the width of the tread face, so that the overall rate of wear is excessive. If the distribution of the vehicle weight across the tread face could be accurately measured, and maintained uniform, the mileage life of a tire could be multiplied. No air pressure gauge measures or indicates this weight distribution, but the provision of a gauge capable of doing so is the object of the present invention.

Generally, this object is accomplished by the provision of a gauge including a surface on to which the tire of a vehicle may be driven to be supported thereby, this surface being formed by a series of heavy bars extending parallel to the vertical plane of the tire and disposed in side by side relation whereby their upper edges normally form a planar surface. Said bars are coaxially pivoted at one end on a horizontal axis, and each is supported at its opposite end by an individual compression spring. Each bar has a transverse width equal to only a small fraction of the transverse width of the tire tread. Thus an improperly inflated tire, in the sense that the distribution of vehicle weight transversely across its tread is non-uniform, will depress the bars unequally, so that such non-uniformity is visually indicated, and the tire may be further inflated or deflated, as necessary, so that said weight distribution is in fact uniform, as indicated by an equal depression of all of the bars engaged by the tire tread.

Another object is the provision of an inflation gauge of the general character described including special means whereby any inequality of depression of the bars may be more easily observed, either at the gauge itself or at any desired station remote from the gauge.

Other objects are simplicity and economy of construction, and efficiency and dependability of operation.

Figure 2:
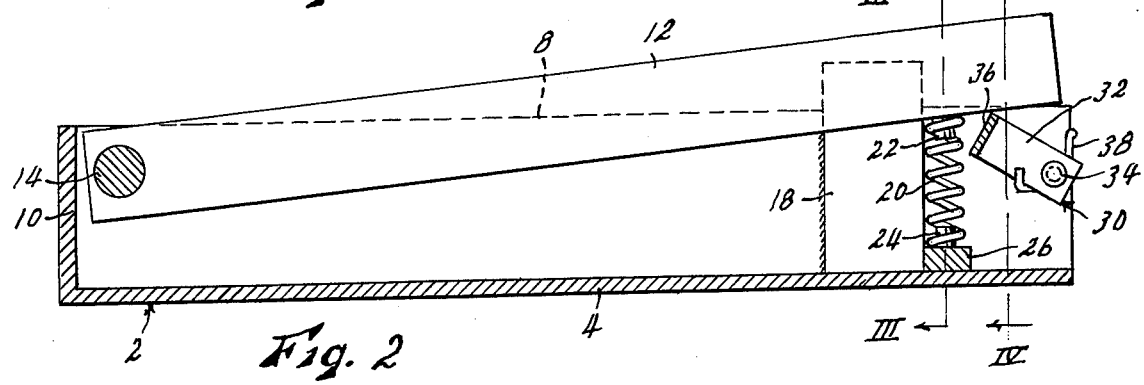
Figure 3:
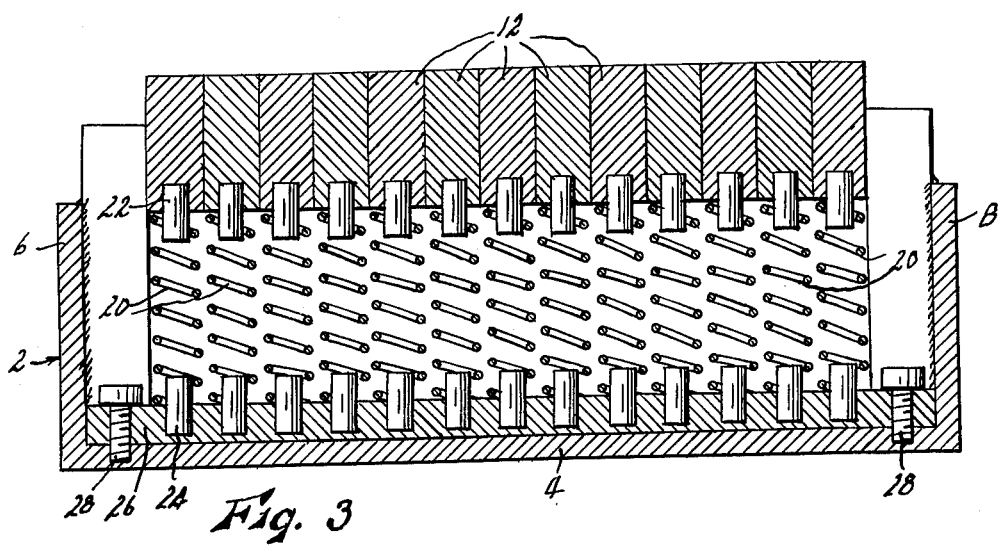

With these objects in view, as well as other objects which will appear in the course of the specification, reference will be had to the accompanying drawing, wherein:

FIG. 1 is a top plan view of a tire inflation gauge embodying the present invention, FIG. 2 is a sectional view taken on line II—II of FIG. 1, FIG. 3 is an enlarged sectional view taken on line III—III of FIG. 2, FIG. 4 is a reduced sectional view taken on line IV—IV of FIG. 2, showing an over-inflated vehicle tire supported operatively thereon, FIG. 5 is a view similar to FIG. 4, but showing an underinflated tire, FIG. 6 is a view similar to FIG. 4, but showing a properly inflated tire, FIG. 7 is a fragmentary view similar to FIG. 2, but showing a modification providing for electrical indication at a remote station, FIG. 8 is a sectional view taken on line VIII—VIII of FIG. 7, and FIG. 9 is a schematic wiring diagram of the electrical indicating system utilized in FIGS. 7 and 8.

Like reference numerals apply to similar parts throughout the several views, and the numeral 2 applies generally to the frame of the guage, said frame comprising an open-topped box formed rigidly of heavy plate metal and including a floor 4, side walls 6 and 8, and rear wall 10, being open at its forward end. Extending forwardly and rearwardly in the upper portion of the frame box are a series of straight tread bars 12. Said tread bars are of equal transverse width, each having a width equal to only a small fraction of the transverse width of an automobile tire tread, being disposed in abutting side-by-side relation, and each bar being slidably movable in a vertical direction relative to the adjoining bars. At their rearward ends, all of the tread bars are pivotally mounted on a heavy shaft 14 which extends horizontally between and is affixed in side walls 6 and 8 of the frame. The total combined width of the tread bars is somewhat less than the distance between said side walls, and they are maintained centered between said side walls by spacer washers 16 mounted on said shaft adjacent said side walls. Said tread bars extend generally to the forward end of the frame, and are vertically guided adjacent their forward ends between a pair of posts 18 affixed respectively to the inner surfaces of side walls 6 and 8.

Each tread bar 12 is independently supported adjacent its forward end by a helical compression spring 20 arranged generally vertically, being engaged at its upper end about a post 22 fixed in the lower surface of the associated bar 12, and at its lower end about a post 24. For convenience, the lower posts 24 of all of the springs may be mounted in a single transversely extending bar 26 supported on frame floor 4 and affixed thereto by screws 28. Preferably, the springs are of such length that bars 12 will normally be inclined slightly upwardly toward their forward ends, as shown in FIG. 2, when they are not supporting a vehicle tire thereon. It is important to the accuracy of the gauge that all of springs 20 be equal length and of equal elastic moduli, in order that they will normally support all of the tread bars at an equal elevation, so that the upper surfaces of said bars will form a planar tread surface onto which a vehicle tire may be driven, and in order that each bar will be pivoted downwardly about shaft 14, compressing its supporting spring 20, to equal degrees by equal weights imposed thereon. Such equality of spring lengths and elastic moduli are difficult to provide with great accuracy, but sufficient uniformity to produce a reasonably reliable and accurate gauge is obtainable with little difficulty.

As a visual guide, shown in FIGS. 1, 2 and 4–6, a U-shaped gauge bar 30 may be positioned beneath the forward ends of tread bars 12, forwardly of supporting springs 20. Said gauge bar includes parallel end portions 32 disposed respectively adjacent and parallel to side walls 6 and 8, and pivoted coaxially to said side walls by pivots 34, and a horizontal central section 36 which extends transversely beneath the forward end portions of bars 12. The gauge bar is biased to urge central section 36 thereof upwardly against bars 12 by clock springs 36 mounted on pivots 34. Said clock springs are of small strength as compared to springs 20, so as not to interfere appreciably with the depression of tread bars 12 by vehicle weight imposed thereon.

In operation, frame 2 is supported in the position shown on a surface over which a vehicle may be driven, such as a roadway surface, or it may be recessed into such a surface, as into the tread surface of a hydraulic vehicle lift. If recessed in such a lift, the forward end of the frame 2 should be visible beneath the lift surface to permit observation of the forward ends of bars 12, or of gauge bar 30, as will appear. The vehicle is then driven forwardly onto tread bars 12 so that a tire 40 of said vehicle is supported on said tread bars, as shown in FIGS. 4–6, intermediate shaft 14 and springs 20. Springs 20 may easily be of sufficient combined strength to support the portion of the vehicle weight carried by that tire which is imposed thereon. The downward depression of each bar 12 is limited by the abutting engagement of the spring guide pins 22 and 24 associated with that bar, which may be termed at "bottoming out" of that spring, but in the operation of the gauge it is essential that each tread bar 12 be spring-supported. Therefore, if any of springs 20 actually do "bottom out," the vehicle is merely backed to move tire 40 closer to shaft 14, thereby shifting a larger proportion of the weight to said shaft, until all of tread bars 12 are "floating" on their respective springs 20.

Tire 40, thus supported on tread bars 12, which may yield and be depressed unequally by unequal weight imposed thereon, is free to demonstrate the previously discussed tendency of its tread to assume a transversely convex curvature if it is over-inflated, or to assume a transversely concave curvature if it is underinflated. Thus, if it is over-inflated as illustrated in FIG. 4, those bars 12 engaging the transversely central portion of the tire tread will be depressed further than those engaging the side portions of the tread, while if it is underinflated, as illustrated in FIG. 5, the central bars will be depressed to a lesser degree than the side bars. The condition of inflation of the tire may actually be detected simply by observing the forward ends of bars 12, since any difference of elevation thereof is readily visible, but the use of gauge bar 30, as shown, renders the pattern of depression of the bars more conveniently and accurately observable.

When the inflation condition of the tire has been determined by the above procedure, air is supplied to the tire, or bled therefrom, as required, until all of the tread bars engaged by the tire tread are depressed equally, as illustrated in FIG. 6, and as indicated by the fact that all such tread bars are engaged by gauge bar 30, which represents the optimum tire inflation for producing maximum mileage from the tire, by providing a uniform loading of the tread across its entire width. Of course, the positions of those tread bars 12 not engaging the tire at all, or engaging some portion of the tire other than its tread surface, such as the outwardly ballooned side walls 42 thereof, also as shown in FIGS. 4–6, may be disregarded. As previously discussed, the present gauge does not directly respond to actual air pressure in the tire, although it is affected thereby, and the air pressure necessary to produce the desired inflation illustrated in FIG. 6 bears no necessary relationship to tire pressures which may be ordinarily recommended, although it is usually somewhat higher. The optimum pressure determined by the present gauge may also be affected by such factors as tire design and construction, temperature, and previous degree and type of tire wear.

FIGS. 7–9 show a modification of the gauge reading device, to be used in place of gauge bar 30, which permits reading of the gauge from any desired remote location, which permits the frame box to be closed at its forward end, and to be recessed completely into a solid roadway surface, such as concrete, since no visual observation of the tread bars 12 themselves, or of the vertical spacing between their forward ends, is required. This remote-reading device includes a rigid switch bar 44 extending horizontally and transversely beneath the forward ends of tread bars 12, in front of springs 20. Said switch bar is supported at each end for vertical sliding movement on a vertical post 46 fixed at its lower end in frame floor 4, and is biased upwardly by a coiled compression spring 48 encircling each of said posts, the upward movement of the switch bar being limited by enlarged heads 50 of said posts.

Mounted on switch bar 44 is a switch housing 52 in which are mounted a series of normally open electric switches 54 (see FIG. 9). Said switches correspond in number to the number of tread bars 12, and each is closed by the depression of a corresponding operating button 56 projecting upwardly from switch housing 52. The operating button 56 of each switch is disposed directly beneath the forward end of the corresponding tread bar 12, and is depressed by the engagement therewith of a pin 58 fixed in said tread bar, all of pins 58 projecting equally downwardly from said tread bars. Heads 50 of posts 46 limit the elevation of the switch bar and switch housing to a position in which switch operating buttons 56 are spaced slightly below the lower ends of pins 58 when the tread bars are in their normal raised positions. Springs 48 are relatively quite weak as compared to springs 20, being of sufficient strength only to support the switch bar and switch housing to permit depression of switch operating buttons 56 by pins 58. Any greater downward movement of any of tread bars 12 will simply force switch bar 44 downwardly on posts 46 against springs 48. Switches 54 are of the microswitch type, requiring extremely light pressure on their operating buttons 56, and extremely small movement of said buttons, for their operation. Hence springs 48 my be sufficiently weak as not to affect or interfere appreciably with the motion of tread bars 12 against the stronger springs 20. In FIG. 9, a pair of electric supply wires 60 and 62 are shown, wire 60 being connected to one terminal each of all switches 54, and wire 62 being connected to one terminal each of a series of electric light bulbs 64 equal in number to and corresponding respectively with switches 54. Bulbs 64 are mounted on an indicator panel 66 which may be disposed at any desired location remote from frame 2 itself. The second terminal of each switch 54 is connected to the second terminal of its corresponding bulb 64 by a separate wire 68. It will be understood that the lead wires to switches 54 may be enclosed to a flexible cable connected to switch housing 52, so as not to interfere with the vertical movement of said housing. The remaining structure is identical to that shown in FIGS. 1-6.

Thus, in operation of the gauge as shown in FIGS. 7-9, it will be seen that when a vehicle tire 40 is positioned on tread bars 12 as previously described, and is properly inflated, all of the tread bars 12 engaging the tread face of the tire will be equally depressed, and all of the corresponding bulbs 64 will be lighted. However, if the tire tread assumes a transversely convex curvature as in FIG. 4, indicating over-inflation, or a transversely concave curvature as in FIG. 5, indicating under-inflation, tread bars 12 will be unequally depressed, and only a portion of bulbs 64 will be lighted, the lighted bulbs corresponding to the more deeply depressed tread bars, and the un-lighted bulbs corresponding to the less deeply depressed tread bars. Hence the pattern of the lighted and unlighted bulbs furnishes a ready indication as to whether the tire is over-inflated or under-inflated, and air may be added thereto or bled therefrom, as required, until the bulbs corresponding to all of the tread bars engaged by the tire tread are lighted, indicating proper tire inflation. Here again, the bulbs 64 corresponding to tread bars not engaging the tire at all, or engaging some portion of the tire other than its tread face, may be disregarded. The aggregate width of tread bars 12 should be great enough to accomodate the widest tire tread likely to be encountered, and narrower tires will not then engage all of the tread bars.

While I have shown and described certain specific embodiments of my invention, it will be readily apparent that many minor changes of structure and operation could be made without departing from the spirit of the invention.

What I claim as new and desire to protect by Letters Patent is:

1. An inflation gauge for a vehicle tire operating on a principle that the tread face of said tire will tend to assume a transversely convex curvature if over-inflated, a transversely concave curvature if under-inflated, and a transversely straight configuration if properly inflated, said gauge comprising:
    a. a frame,
    b. a series of elongated tread bars all pivoted coaxially at one end in said frame and extending generally horizontally from said pivot in side by side relation, whereby the upper surfaces thereof in aggregate form a treadway for supporting the weight of a tire positioned thereon with its vertical plane parallel to the longitudinal extent of said tread bars, the transverse width of each tread bar being a small fraction of the tread width of the tire and the aggregate width of said tread bars being at least as great as the tread width of the tire, and
    c. resiliently yieldable means supporting the end of each of said tread bars opposite from its pivot, and operable to support all of said tread bars at equal elevations when not loaded by a tire, whereby said treadway is substantially planar, and being of equal elastic moduli whereby all of said tread bars will be equally depressed by equal tire weights imposed thereon, as a result of which said tread bars will be unequally depressed by an improperly inflated tire supported on said treadway, the pattern of said unequal depression indicating the nature of the improper inflation, said treadway being of sufficient length to support the entire road-engaging surface of said tire intermediate the ends thereof, whereby the proportion of the weight imposed by said tire on said tread bars which is supported by said resiliently yieldable means may be varied by centering said tire relatively closer to or further from the ends of said bars supported by said resiliently yieldable means.

2. An inflation gauge as recited in claim 1 wherein said resiliently yieldable means of each of said tread bars constitutes a compression spring, all of said springs being based in said frame at equal elevations and each supporting one of said tread bars at its upper end, all of said springs being of substantially equal lengths and elastic moduli.

3. An inflation gauge as recited in claim 1 wherein said tread bars, at their resiliently supported ends, project from beneath a tire supported on said treadway to a position readily observable by an operator, and with the addition of gauge reading means comprising a horizontally and transversely extending indicator member carried by said frame and disposed beneath the projecting portions of said tread bars, said indicator member having a straight, horizontal upper edge disposed adjacent the lower edges of said tread bars, whereby the relative depression of said tread bars relative to said indicator member may be more readily visually observed.

4. An inflation gauge as recited in claim 3 with the addition of resilient means carried by said frame and biasing said indicator member yieldably upwardly to urge the straight upper edge thereof into engagement with only the most deeply depressed of said tread bars, said last named resilient means being relatively much weaker than said resiliently yieldable means supporting said tread bars.

5. An inflation gauge as recited in claim 1 with the addition of gauge reading means comprising:
    a. a switch supporting member carried by said frame and extending transversely beneath all of said tread bars,
    b. resilient means yieldably biasing said switch supporting member upwardly,
    c. a series of normally open electric switches carried by said switch supporting member, said switches corresponding in number to said tread bars and each associated with one of said tread bars, each switch being closable by engagement of the associated tread bar with an operating member of said switch when said associated tread bar is depressed, all of said switches being maintained by said switch supporting member at equal elevations relative to said frame, and
    d. a series electric light bulbs disposed remotely from said frame, each bulb being electrically associated with one of said switches to be lighted by closure of said associated switch.

* * * * *